United States Patent
Li et al.

(10) Patent No.: US 10,681,689 B2
(45) Date of Patent: *Jun. 9, 2020

(54) METHOD, BASE STATION AND USER EQUIPMENT FOR SUBFRAME CONFIGURATION IN TIME DIVISION DUPLEX SYSTEM

(71) Applicant: Huawei Technologies Co., Ltd., Shenzhen (CN)

(72) Inventors: Chaojun Li, Beijing (CN); Yongxia Lv, Ottawa (CA); Xiaoan Fan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/286,141

(22) Filed: Feb. 26, 2019

(65) Prior Publication Data

US 2019/0200327 A1 Jun. 27, 2019

Related U.S. Application Data

(63) Continuation of application No. 15/286,219, filed on Oct. 5, 2016, now Pat. No. 10,251,168, which is a (Continued)

(30) Foreign Application Priority Data

Mar. 31, 2011 (CN) .......................... 2011 1 0081085

(51) Int. Cl.
*H04W 72/04* (2009.01)
*H04W 88/08* (2009.01)
(Continued)

(52) U.S. Cl.
CPC ........ *H04W 72/042* (2013.01); *H04B 7/2656* (2013.01); *H04L 5/1469* (2013.01); *H04W 72/0446* (2013.01); *H04W 88/08* (2013.01)

(58) Field of Classification Search
None
See application file for complete search history.

(56) References Cited

U.S. PATENT DOCUMENTS 9,491,747 B2   11/2016  Li
10,064,171 B2 *  8/2018  Suzuki ................ H04W 72/042
(Continued)

FOREIGN PATENT DOCUMENTS

CN      101404539 A    4/2009
CN      101483510 A    7/2009
(Continued)

OTHER PUBLICATIONS

"3rd Generation Partnership Project, Techical Spectication Group Radio Access Network; Evolved Universal Terrestrial Radio Access (E-UTRA); Multiplexing and channel coding (Release 1 O)," 3GPP TS 36.212, V10.1.0, pp. 1-76, 3rd Generation Partnership Project, Valbonne, France (Mar. 2011).

(Continued)

*Primary Examiner* — Lonnie V Sweet
(74) *Attorney, Agent, or Firm* — Leydig, Voit & Mayer, Ltd.

(57) ABSTRACT

Disclosed are a method, a base station and a user equipment for subframe configuration in a time division duplex system. The method comprises: a base station determining a subframe number of a flexible subframe in a radio frame; the base station determining a feature of the flexible subframe corresponding to the subframe number, where the feature indicates that the flexible subframe is an uplink subframe or a downlink subframe; and the base station sending to a user (Continued)

| The base station determines the subframe number of a flexible subframe. | 301 |

| The base station determines the feature of the flexible subframe corresponding to the subframe number, where the feature indicates that the flexible subframe is an uplink subframe or a downlink subframe. | 302 |

| The base station determines channel and signal configuration of the flexible subframe. | 303 |

| The base station sends to a user equipment a first signaling via a downlink control channel, where the first signaling includes the feature of the flexible subframe, the subframe number of the flexible subframe, and the channel and signal configuration. | 304 | equipment a first signaling via a downlink control channel, where the first signaling includes the feature of the flexible subframe corresponding to the subframe number.

22 Claims, 5 Drawing Sheets

Related U.S. Application Data continuation of application No. 14/041,455, filed on Sep. 30, 2013, now Pat. No. 9,491,747, which is a continuation of application No. PCT/CN2012/073437, filed on Mar. 31, 2012.

(51) Int. Cl.
*H04L 5/14* (2006.01)
*H04B 7/26* (2006.01)

(56) References Cited

U.S. PATENT DOCUMENTS

| | | | |
|---|---|---|---|
| 10,090,990 B2 * | 10/2018 | Suzuki | H04L 5/001 |
| 10,251,168 B2 * | 4/2019 | Li | H04L 5/1469 |
| 2008/0279187 A1 | 11/2008 | Steele et al. | |
| 2009/0116587 A1 | 5/2009 | Kwasinski et al. | |
| 2010/0027447 A1 | 2/2010 | Choi et al. | |
| 2010/0182939 A1 | 7/2010 | Ojala | |
| 2010/0195586 A1 | 8/2010 | Choi | |
| 2011/0007673 A1 | 1/2011 | Ahn | |
| 2011/0085506 A1 | 4/2011 | Lee | |
| 2011/0149813 A1 | 6/2011 | Parkvall | |
| 2011/0176461 A1 * | 7/2011 | Astely | H04B 7/2656 370/280 |
| 2011/0235584 A1 * | 9/2011 | Chen | H04L 1/008 370/328 |
| 2011/0235743 A1 | 9/2011 | Lee, II | |
| 2011/0321050 A1 * | 12/2011 | Ho | H04W 4/08 718/102 |
| 2012/0195267 A1 | 8/2012 | Dai | |
| 2013/0010720 A1 | 1/2013 | Lohr | |
| 2013/0155868 A1 | 6/2013 | Seo | |
| 2014/0293909 A1 | 10/2014 | Xu et al. | |

FOREIGN PATENT DOCUMENTS

| | | |
|---|---|---|
| CN | 101567766 A | 10/2009 |
| CN | 101606347 A | 12/2009 |
| CN | 101610110 A | 12/2009 |
| CN | 101677255 A | 3/2010 |
| CN | 101754396 A | 6/2010 |
| CN | 101784125 A | 7/2010 |
| CN | 102271032 A | 12/2011 |
| CN | 102377717 A | 3/2012 |
| EP | 2204937 A1 | 7/2010 |
| WO | 2009116751 A2 | 9/2009 |
| WO | 2010049587 A1 | 5/2010 |

OTHER PUBLICATIONS

"3rd Generation Partnership Project, Techical Specification Group Radio Access Network; Evolved Universal Terrestrial Radio Access (E-UTRA); Physical layer procedures (Release 1 O)," 3GPP TS 36.213, V10.1.0, pp. 1-115, 3rd Generation Partnership Project, Valbonne, France (Mar. 2011).

"3rd Generation Partnership Project, Techical Specification Group Radio Access Network; Evolved Universal Terrestrial Radio Access (E-UTRA); Radio Resource Control (RRC); Protocol specification (Release 1 O)," 3GPP TS 36.331, V10.1.0, pp. 1-290, 3rd Generation Partnership Project, Valbonne, France (Mar. 2011 ).

* cited by examiner

METHOD, BASE STATION AND USER EQUIPMENT FOR SUBFRAME CONFIGURATION IN TIME DIVISION DUPLEX SYSTEM

CROSS-REFERENCE TO RELATED APPLICATIONS

This application is a continuation of U.S. patent application Ser. No. 15/286,219, filed on Oct. 5, 2016, which is a continuation of U.S. patent application Ser. No. 14/041,455, filed on Sep. 30, 2013, now U.S. Pat. No. 9,491,747, which is a continuation of International Application No. PCT/CN2012/073437, filed on Mar. 31, 2012. The International Application claims priority to Chinese Patent Application No. 201110081085.7, filed on Mar. 31, 2011. All of the afore-mentioned patent applications are hereby incorporated by reference in their entireties.

TECHNICAL FIELD

The present disclosure relates to the field of communications technologies, and more particularly to a method, a base station and a user equipment for subframe configuration in time division duplex system.

BACKGROUND

A long term evolution (LTE) system supports time division duplex (TDD), that is, an uplink (UL) and a downlink (DL) use different time slots on the same frequency. The LTE TDD system can semi-statically configure uplink-downlink configuration according to a traffic type, so as to satisfy different uplink-downlink asymmetric traffic demands. In the LTE TDD system, the adopted uplink-downlink configuration is configured semi-statically, and cannot be changed dynamically, which leads to a mismatch between a current uplink-downlink configuration and an instantaneous uplink-downlink traffic amount, and thus resources cannot be effectively used, which is particularly serious for a cell with less number of users.

In order to solve the above problem, a concept of dynamic TDD subframe configuration has been introduced, that is, some flexible subframes are configured in a radio frame, where each flexible subframe can be dynamically configured to be an uplink subframe or a downlink subframe.

In the prior art, however, a user equipment cannot acquire features of the flexible subframes in the scenario of the dynamic TDD subframe configuration and, thus, cannot subsequently perform data interaction with the base station according to the features.

SUMMARY

Embodiments of the present disclosure provide a method, a base station and a user equipment for subframe configuration in a time division duplex system, so as to solve the problem in the prior art that the user equipment cannot know whether a flexible subframe is an uplink subframe or a downlink subframe.

In order to solve the above technical problem, embodiments of the present disclosure provide a method for subframe configuration in a time division duplex system, comprising:

determining, by a base station, a subframe number of a flexible subframe in a radio frame;

determining, by the base station, a feature of the flexible subframe corresponding to the subframe number, where the feature indicates that the flexible subframe is an uplink subframe or a downlink subframe; and sending, by the base station, to a user equipment a first signaling via a downlink control channel, where the first signaling includes the feature of the flexible subframe corresponding to the subframe number.

Embodiments of the present disclosure provide a base station, comprising:

a first processing unit, configured to determine a subframe number of a flexible subframe in a radio frame;

a second processing unit, configured to determine a feature of the flexible subframe corresponding to the subframe number determined by the first processing unit, where the feature indicates that the flexible subframe is an uplink subframe or a downlink subframe;

a sending unit, configured to send to a user equipment a first signaling via a downlink control channel, where the first signaling includes the feature of the flexible subframe corresponding to the subframe number determined by the second processing unit.

Embodiments of the present disclosure provide a method for subframe configuration in a time division duplex system, comprising:

acquiring, by a user equipment, a subframe number of a flexible subframe;

receiving a first signaling sent by a base station via a downlink control channel, where the first signaling includes a feature of the flexible subframe corresponding to the subframe number, and the feature indicates that the flexible subframe is an uplink subframe or a downlink subframe;

acquiring, according to the received first signaling, the feature of the flexible subframe corresponding to the subframe number.

Embodiments of the present disclosure provide a user equipment, comprising:

a fourth processing unit, configured to determine a subframe number of a flexible subframe;

a receiving unit, configured to receive a first signaling sent by a base station via a downlink control channel, where the first signaling includes a feature of the flexible subframe corresponding to the subframe number determined by the fourth processing unit, and the feature indicates that the flexible subframe is an uplink subframe or a downlink subframe;

an acquiring unit, configured to acquire, according to the first signaling received by the receiving unit, the feature of the flexible subframe corresponding to the subframe number.

Embodiments of the present disclosure have advantages as follows:

in the embodiments of the present disclosure, a base station can notify a user equipment of feature configuration of a flexible subframe by way of signaling via a downlink control channel, so that the user equipment can know the feature of the flexible subframe, and then can communicate normally with the base station on the flexible subframe based on the feature of the flexible subframe.

BRIEF DESCRIPTION OF DRAWINGS

To illustrate the technical solution of the present disclosure or the prior art more clearly, the accompanying drawings used in description of the embodiments of the present disclosure or the prior art are briefly described hereunder. Apparently, the accompanying drawings illustrate only some embodiments of the disclosure and persons skilled in the art can derive other drawings from these drawings without any creative effort.

DESCRIPTION OF EMBODIMENTS

The technical solutions in embodiments of the present disclosure are hereinafter described clearly and completely with reference to the accompanying drawings in embodiments of the present disclosure. Evidently, the embodiments described here are only a part of the embodiments of the disclosure, rather than all of the embodiments of the disclosure. All other embodiments obtained by persons skilled in the art based on the embodiments of the present disclosure without any creative effort shall fall within the protection scope of the disclosure.

In order to make the above object, features, and advantages of embodiments of the present disclosure more comprehensible, embodiments of the present disclosure are hereinafter described in detail with reference to the accompanying drawings and specific implementations of the present disclosure.

There are altogether seven types of uplink-downlink configurations in a LTE TDD system, as shown in Table 1, where 'D' indicates a downlink subframe, 'U' indicates an uplink subframe, and 'S' indicates a special subframe, which is mainly used for downlink transmission. Seen from Table 1, for each uplink-downlink configuration, the time domain resource reserved for the downlink traffic takes up 40% to 90%.

TABLE 1

| Configuration | Repeating period | | | | | Subframe number | | | | |
|---|---|---|---|---|---|---|---|---|---|---|
| number | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The flexible subframe in the context of the present disclosure refers to a subframe that can be dynamically or semi-statically configured to be an uplink subframe or a downlink subframe within a valid time of each TDD uplink-downlink configuration. For user equipment of an existing version, such as user equipments of LTE Rel-8/9/10, the system notifies the current seven types of uplink-downlink subframe configurations via a broadcast signaling; for user equipment of an evolution system, such as the user equipment of LTE Rel-11/12 etc., the system can semi-statically or dynamically notify different uplink-downlink subframe configurations, which can be the existing seven types of configurations, also can be a newly added uplink-downlink subframe configuration, for example, when the existing system and the evolution system both notify according to the existing seven types of configurations, subframes 3, 4, 5, 6, 7, 8 and 9 can be considered to be flexible subframes, and when the existing system and the evolution system both are based on the three types 0, 1 and 2 of uplink-downlink subframe configurations, subframes 3, 4, 8 and 9 can be considered to be flexible subframes. Therefore, the configuration of the flexible subframe according to the present disclosure can be achieved by notifying user equipment in the evolution system of the uplink-downlink subframe configuration.

Figure 1:
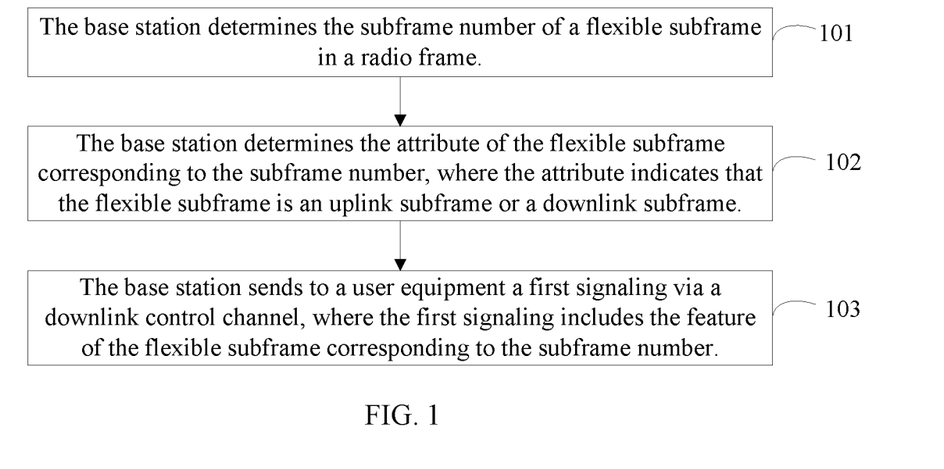
FIG. 1 is a flow chart of a method for subframe configuration in a time division duplex system according to a first embodiment of the present disclosure.

Referring to FIG. 1, in a first embodiment of the present disclosure, a method, provided for implementing the first embodiment, may comprise the following steps:

Step 101: A base station determines the subframe number of a flexible subframe in a radio frame.

The base station determining the subframe number of a flexible subframe means that the base station determines which subframes are flexible subframes. A radio frame in the LTE TDD system includes ten subframes, and which subframes therein are flexible subframes needs to be determined by the base station, or which subframes in a plurality of radio frames are flexible subframes needs to be determined by the base station. It should be noted that, there are two manners of determining the subframe number of a flexible subframe for the base station:

First Manner: the base station determines, according to a predefined subframe number of the flexible subframe, the subframe number of a flexible subframe in the radio subframe.

Figure 2:
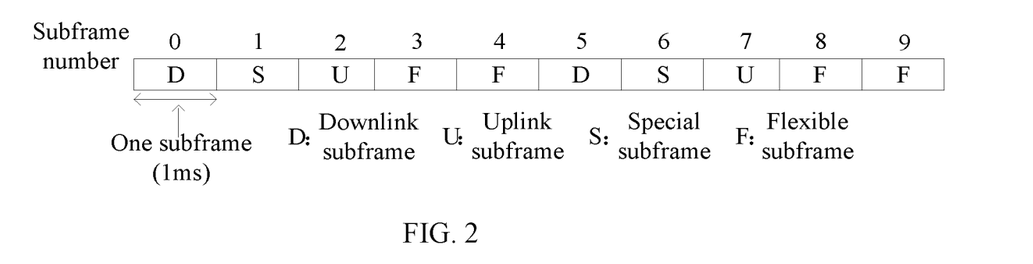
FIG. 2 is a schematic diagram of a dynamic TDD subframe configuration in a radio frame according to an embodiment of the present disclosure.

Referring to FIG. 2, which is a schematic diagram of a dynamic TDD subframe configuration in a radio frame, Nos. 3, 4, 8 and 9 subframes in each radio frame are flexible subframes. At this time, Nos. 3, 4, 8 and 9 subframes in each radio frame need to be predefined as flexible subframes at both the base station side and user equipment side. Meanwhile, since the TDD system has seven types of uplink-downlink configurations and the flexible-subframe configuration in each type of uplink-downlink configuration can be different, the subframe number of the flexible subframe in each type of uplink-downlink configuration can be pre-defined for each type of uplink-downlink configuration.

Second manner: the base station configures the subframe number of a flexible subframe.

In particular, the base station can autonomously configure the subframe number of a flexible subframe, according to the current channel environment and traffic amount and etc.

It should be noted that, the base station doesn't need to notify the user equipment of the subframe number of the flexible subframe if the first manner is adopted, and the base station still needs to additionally send a signaling to notify the user equipment if the second manner is adopted, because the subframe number of the flexible subframe is variable. The signaling can be carried via a downlink control channel or a higher layer signaling. Preferably, the base station can adopt a higher layer signaling, so as to improve the reliability. Where, a higher layer signaling, compared to a physical layer signaling, is a signaling from a higher layer with a slower transmission frequency, including a radio resource control (RRC) signaling and a media access control (MAC) signaling and a broadcast signaling and so on.

Step 102: The base station determines the feature of the flexible subframe corresponding to the subframe number, where the feature indicates that the flexible subframe is an uplink subframe or a downlink subframe.

After determining the subframe number of the flexible subframe, the base station can further configure the feature of the flexible subframe corresponding to the determined subframe number, that is, configure each flexible subframe to be either an uplink subframe or a downlink subframe.

Step 103: The base station sends to a user equipment a first signaling via a downlink control channel, where the first signaling includes the feature of the flexible subframe corresponding to the subframe number.

The downlink control channel in this step refers to a channel within a downlink control region, which can include a physical downlink control channel (PDCCH), a physical hybrid-ARQ indicator channel (PHICH) or a physical control format indicator channel (PCFICH) and so on. The downlink control region is the first 1 to 4 orthogonal frequency division multiplexing (OFDM) symbols in each subframe, and can be indicated via the PCFICH.

In this step, the number of bits for indicating the feature of the flexible subframe in the first signaling can be determined according to any of the following parameters: number of the flexible subframes included in the repeating period, number of the flexible subframes included in the radio frame or number of the flexible subframes included in an updatable period of the first signaling, and because some signaling periods cannot be updated, the updatable period refers to the period of the first signaling which can be updated. One bit can be used to indicate the feature of one flexible subframe, for example, "0" indicates an uplink subframe, and "1" indicates a downlink subframe, alternatively, "1" indicates the uplink subframe, and "0" indicates the downlink subframe. Referring to FIG. 2, there are 2 flexible subframes in a repeating period of 5 milliseconds (ms), and then 2 bits are needed; or there are 4 flexible subframes in a radio frame of 10 ms, and then 4 bits are needed, or the updatable period of the signaling is 20 ms, so 8 bits are needed because 8 flexible subframes are included.

It should be noted that, in order to save network overhead, one bit also can indicate the feature of a plurality of flexible subframes, for example, one bit indicates the feature of all the flexible subframes in one repeating period, and then "0" indicates all the flexible subframes in one repeating period are uplink subframes, and "1" indicates all the flexible subframes in one repeating period are downlink subframes; or, "1" indicates all the flexible subframes in one repeating period are uplink subframes, and "0" indicates all the flexible subframes in one repeating period are downlink subframes.

Furthermore, optionally, when the subframe number of the flexible subframe is also indicated via the downlink control channel, the first signaling can further include a subframe number indication of the flexible subframe.

The first signaling can be a dynamic notification, a periodic notification or a semi-persistent notification. The configuration of the flexible subframe is more flexible when the dynamic notification is adopted; reliability can be improved and the overhead is saved when the periodic notification is adopted; and the overhead can be saved and the configuration of the flexible subframe is flexible when the semi-persistent notification is adopted. Where, the semi-persistent notification means that the base station configures a first signaling and sends it to a user equipment only when the configuration of the flexible subframe is updated. It should be noted that, when the number of bits needed by the first signaling is determined according to the number of the flexible subframes included in the repeating period or the radio frame, the updating period of the signaling is at least the repeating period or a length of the radio frame.

In this embodiment, the feature of the flexible subframe configured by the base station can be sent to the user equipment via the downlink control channel, thus the problem in the prior art that the user equipment cannot be notified of the configuration of the flexible subframe via the signaling can be solved, and meanwhile the reliability of the signaling is relatively high, allowing the user equipment to accurately acquire the configuration of flexible subframe. Where, the configuration of the flexible subframe can include the subframe number configuration of the flexible subframe and the feature configuration of the flexible subframe. Further, channel and signal configuration of the flexible subframe can also be included, which will be described in detail in the next embodiment.

Figure 3:
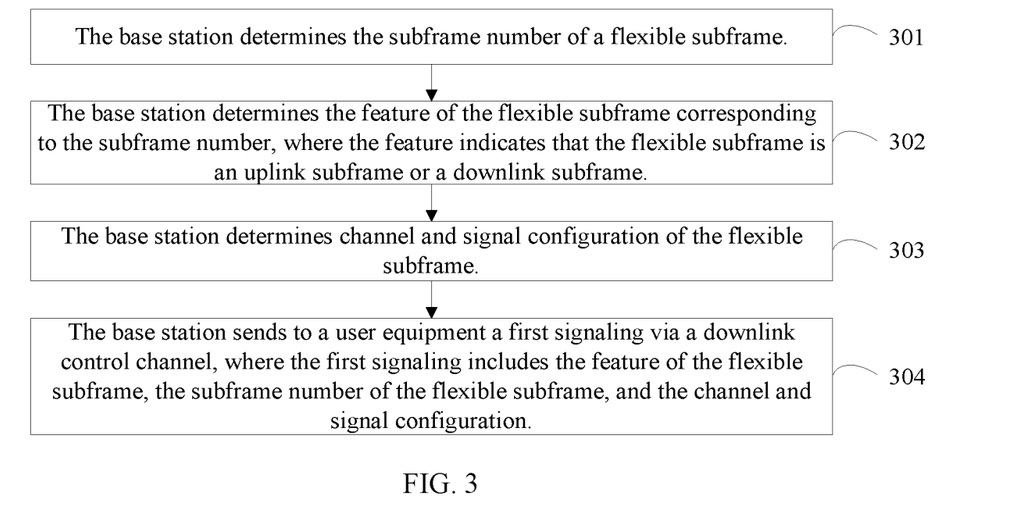
FIG. 3 is a flow chart of a method for subframe configuration in a time division duplex system according to a second embodiment of the present disclosure.

Referring to FIG. 3, in a second embodiment of the present disclosure, the downlink control channel is a physical downlink control channel, a method, provided for implementing the second embodiment, can include the following steps:

Step 301: A base station determines the subframe number of a flexible subframe.

Step 302: The base station determines the feature of the flexible subframe corresponding to the subframe number, where the feature indicates that the flexible subframe is an uplink subframe or a downlink subframe.

Step 303: The base station determines channel and signal configuration of the flexible subframe.

After determining the feature of the flexible subframe, the base station can further determine which channel and signal need to be configured on the flexible subframe.

When the flexible subframe is an uplink subframe, the base station needs to determine whether the flexible subframe is configured with a physical uplink control channel (PUCCH), a sounding reference signal (SRS) and so on; when the flexible subframe is a downlink subframe, the base station needs to determine whether the flexible subframe is configured with a PDCCH, a PHICH, a PCFICH, a common reference signal (CRS), a channel state information reference signal (CSI RS) and so on.

After determining the channel and signal configuration of the flexible subframe, the base station needs to send a signaling to notify the user. The content of the signaling includes which channel and signal are configured on the flexible subframe, and channel and signal resource configuration. The signaling for the channel and signal configuration of the flexible subframe can be carried via the following manners:

First manner: carried via a downlink control channel;
Second manner: carried via a higher layer signaling;
Third manner: carried via a combination of a downlink control channel and a higher layer signaling.

For the third manner, in practical application, for example, which channel and signal are configured on the flexible subframe can be carried via the downlink control channel, and the channel and signal resource configuration can be carried via the higher layer signaling.

Optionally, when the channel and signal configuration of the flexible subframe is also indicated via the downlink control channel, the first signaling can further include the channel and signal configuration of the flexible subframe.

Step 304: The base station sends to a user equipment a first signaling via the downlink control channel, where the first signaling includes the feature of the flexible subframe, the subframe number of the flexible subframe, and the channel and signal configuration.

As a practical application example, the first signaling in step 304 simultaneously includes the feature of the flexible subframe, the subframe number of the flexible subframe, and the channel and signal configuration. In other examples, besides always including the feature of the flexible subframe, the first signaling can include both the subframe number and the channel and signal configuration, or include neither the subframe number nor the channel and signal configuration, or include only the subframe number or the channel and signal configuration. In the practical application, the first signaling in step 304 particularly can be carried via different channels, and also can include different processing mechanisms for different channel types.

First mechanism: the first signaling is carried via the PDCCH.

Prior to receiving or sending traffic data, the user equipment needs to know downlink control information (DCI) configured by a eNB for the user equipment. DCI includes a variety of formats. DCI is carried via the PDCCH. A PDCCH set to be detected by the UE is called a search space.

The false alarm (FA) on cyclic redundancy check (CRC) of PDCCH will cause the user equipment to misunderstand the current flexible subframe feature. In all the existing DCI formats, the downlink control information (DCI) bit number (DCI payload, DCI payload size) is relatively big, however, the DCI for indicating the feature of the flexible subframe in dynamic TDD only needs a few bits, so the resource waste is relatively large. Therefore, embodiments of the present disclosure, in order to design a reliable and overhead-saving DCI, provide the following manners:

First manner: the base station configures the same downlink control information for at least two user equipments.

The base station configures a same radio network temporary identifier (RNTI) for at least two user equipments.

Preferably, the DCI is carried on a PDCCH within a common search space. The base station can send the same downlink control information to the user equipment via the physical downlink control channel within the common search space, to facilitate the user equipment to acquire the first signaling via the indicating bit in the downlink control information. Further, since the existing common search space has a limited capacity, the size of the common search space can be extended, particularly to an extent, which can be predefined by a standard or configured via a higher layer signaling.

If the first manner is adopted, the object of notifying the user equipment of the feature of the flexible subframe via signaling can be achieved, and meanwhile the overhead can be reduced significantly, for example, if it originally needs to send five pieces of DCI to five user equipments, however, when the method of this embodiment is adopted, only one piece of DCI needs to be sent, and the five user equipments all can listen to the same DCI, so that more control channel transmission resources can be saved.

Second manner: the base station configures the first signaling carried on one or more than one reserved bit of the downlink control information, and sends the downlink control information to the user equipment via the physical downlink control channel.

In the second manner, the way of reserving bits in the existing DCI formats to indicate the first signaling is adopted. Preferably, the DCI in the common search space is adopted to indicate the first signaling. For example, at least one format is selected out of DCI format 3, DCI format 3A and DCI format 1A.

When the DCI in the common search space is the DCI format 1A scrambled by a system information radio network temporary identity (SI-RNTI, System Information RNTI), a P-RNTI (Paging RNTI) or a random access RNTI (RA-RNTI, Random Access RNTI), in the TDD system, there are 5 redundant bits or reserved bits in the DCI format 1A, which can be used for indicating the first signaling.

When the DCI in the common search space is the DCI format 3, one or more than one bit field is reserved in the DCI format 3, for indicating the first signaling. The particular number of the reserved bits is the number of bits needed for configuring the first signaling, for example, when the first signaling only includes the feature of the flexible subframe, and 4 bits are needed to indicate, then 4 bits are reserved. The DCI format 3 includes a plurality of bit fields, each bit field includes 2 bits and is identified by a transmit power control index (TPC-Index).

The bit fields reserved in the DCI format 3 for indicating the first signaling may be indicated by way of following manners. Manner ⓪, configuring the reserved bit fields via the higher layer signaling. A reserved TPC-Index can particularly be configured, for example, the base station configures reserved TPC-Indexes 1 and 2 for a group of user equipments, with a total of 4 bits, the configuration via the higher layer signaling is flexible and can improve the use efficiency of the bit fields. Manner ②, predefining the reserved bit fields. In this way, no additional signaling configuration is needed, but the reserved bit fields are fixed. Furthermore, when the DCI bit number of the DCI format 3 is an odd number, there is 1 redundant bit, which can be used for indicating the first signaling.

The RNTI used to scramble the CRC field in the DCI format 3 is TPC-PUCCH-RNTI or TPC-PUSCH-RNTI. When the first signaling is indicated via the reserved bit fields in the DCI format 3, even if the user equipment has no need to monitor the TPC in the DCI format 3, the base station also needs to configure and notify the user equipment of the RNTI used to scramble the CRC field in the DCI format 3. When the user equipment needs to monitor the TPC in the DCI format 3, the RNTI of the DCI format 3 used to acquire the TPC and the RNTI of the DCI format 3 used to acquire the first signaling are configured to be the same, that is, the user equipment can acquire TPC and the first signaling by monitoring one same DCI format 3. Such can reduce the average number of PDCCH blind detection attempts, because when the RNTI of the DCI format 3 used to acquire TPC and the RNTI of the DCI format 3 used to acquire a dynamic TDD subframe configuration are different, the user equipment needs to monitor two DCI format 3s scrambled by different RNTIs, leading to an increase on the average number of PDCCH blind detection attempts.

When the DCI in the common search space is the DCI format 3A, the particular configuration manner is similar to the case of the DCI format 3. One or more than one bit field is reserved in the DCI format 3A, for indicating the first signaling. The particular number of the reserved bits is the number of bits needed by the first signaling. The DCI format 3A includes a plurality of bit fields, each bit field includes 1 bit and is identified by a transmit power control index (TPC-Index).

In the DCI format 3A the bit fields reserved for indicating the first signaling can be indicated by way of the following manners. Manner ①, configuring the reserved bit fields via the higher layer signaling, where reserved TPC-Indexes can particularly be configured. Manner ②, predefining the reserved bit fields. The RNTI used to scramble the CRC field in the DCI format 3A is TPC-PUCCH-RNTI or TPC-PUSCH-RNTI. When the first signaling is indicated via the reserved bit fields in the DCI format 3A, even if the user equipment has no need to monitor the TPC in the DCI format 3A, the base station also needs to configure and notify the user equipment of the RNTI used to scramble the CRC field in the DCI format 3A. When the user equipment needs to monitor the TPC in the DCI format 3, the RNTI of the DCI format 3A used to acquire the TPC and the RNTI of the DCI format 3A used to acquire the first signaling are configured to be the same, that is, the user equipment can acquire the TPC and the first signaling by monitoring one same DCI format 3A.

It should be noted that, to reduce the average number of the PDCCH blind detection attempts, the TPC information and the first signaling which are need to be acquired by the same user equipment are carried by the same PDCCH, that is, the adopted DCI formats are the same (either the DCI format 3 or the DCI format 3A), and the adopted RNTIs are the same, in this way, the same user equipment can acquire the TPC information and the first signaling by monitoring only one same DCI.

In order to improve the reliability and reduce the probability of a CRC false alarm, bit fields can be reserved in the DCI to be used as a virtual CRC, that is, the virtual CRC is set to be a particular value, and the user equipment performs further check to determine whether it is the set value after receiving the DCI.

Third manner: the base station generates a new DCI format, for indicating the first signaling. The base station sends the newly-generated downlink control information to the user equipment via the physical downlink control channel.

Because the first signaling only needs few bits, there are two manners to reduce the overhead:

Manner ①: the DCI format only includes the first signaling and CRC information. In order to improve reliability and reduce the probability of a CRC false alarm, the virtual CRC information also can be included. For example, the DCI includes the first signaling of 4 bits or 9 bits, where the first signaling of 4 bits only includes the feature configuration of the flexible subframe, and the first signaling of 9 bits includes the feature configuration of the flexible subframe and the channel and signal configuration; the virtual CRC information of 6 bits and the CRC information of 16 bits, and thus 26 bits are needed altogether. In the existing DCI formats, the DCI format 1C has the smallest number of information bits, and the number of the information bits of the DCI format for indicating the dynamic TDD subframe configuration can be the same as that of the DCI format 1C so as not to increase the number of blind detection attempts. If less than the number of bits of the DCI format 1C, for example, the DCI format 1C corresponding to 20 MHz is 31 bits, the DCI format for indicating the dynamic TDD subframe configuration is 26 bits, and then redundant information bits (i.e., reserved bits) are added, or the virtual CRC bits are lengthened, to make both of the two formats be 31 bits. The DCI format also can be configured to only adopt CCE aggregation levels of 4 or 8 to improve the performance.

Manner ②: the DCI format can indicate other information in addition to the first signaling, such as PDCCH blind detection information (for reducing the number of the blind detection attempts of the user equipment), and PDCCH precoding information.

It should be noted that, the first manner in the first mechanism can be used in combination with the second manner or the third manner. For example, when the first manner and the second manner are used in combination, the TPC information and the first signaling which are needed to be acquired by the at least two user equipments are configured to be carried by the same PDCCH.

Where, in step 304, the first signaling can be carried via other processing mechanisms.

Second mechanism, the downlink control channel is the physical hybrid-ARQ indicator channel, and the first signaling is carried via the PHICH.

A PHICH resource is identified by $n_{PHICH}^{group}$ andqj $n_{PHICH}^{seq}$, where, $n_{PHICH}^{group}$ indicates a PHICH group number, and $n_{PHICH}^{seq}$ indicates an orthogonal sequence number in a PHICH group.

In particular, in the second mechanism, the base station predefines reserved physical hybrid-ARQ indicator channel resources or notifies the user equipment of physical hybrid-ARQ indicator channel resources via the third signaling notification message.

In this embodiment, the reserved PHICH resources can be adopted to carry the first signaling. Where, the reserved PHICH resources cannot be used as an HARQ indicator (HI, HARQ indicator). The reservation manner can be as follows:

First manner: predefine the reserved PHICH resources. In particular, the reserved PHICH resources can be defined via $n_{PHICH}^{group}$ and $n_{PHICH}^{seq}$. When the PHICH resources are not reserved in all the subframes, the subframe number of the subframe in which the PHICH resource is reserved also needs to be defined. For example, the PHICH resources in Nos. 0, 1, 5 and 6 subframes of each radio frame are defined to be reserved for carrying the first signaling. For a PHICH when one downlink subframe corresponds to two uplink subframes, the total PHICH resources may be doubled, at this time, the PHICH resources are divided into two parts, $I_{PHICH}$ identifier can be introduced to indicate a particular part. Therefore, it also needs to be defined to which part of the PHICH resources the reserved PHICH resources belong, and particularly a reserved $I_{PHICH}$ is defined.

Second manner: the base station signals the user equipment of the reserved PHICH resources. Preferably, the higher layer signaling is adopted for notification. In particular, the reserved $n_{PHICH}^{group}$ and $n_{PHICH}^{seq}$ can be notified. When the PHICH resources are not reserved in all the subframes, the subframe number of the subframe in which the PHICH resource is reserved also needs to be signaled. For example, the PHICH resources in Nos. 0, 1, 5 and 6 subframes of each radio frame are reserved for carrying the dynamic TDD subframe configuration signaling. For a PHICH when one downlink subframe corresponds to two uplink subframes, the reserved $I_{PHICH}$ also needs to be notified, where the signaling used by the base station to notify the user equipment in the second manner is the aforementioned third signaling notification message.

In this embodiment, the method of mapping the first signaling to the reserved PHICH resources is to encode the first signaling based on the reserved PHICH resources in one or more subframes. For example, the first signaling is originally 2 bits, 6 PHICH resources are reserved in a subframe, and the TDD subframe configuration signaling can be encoded to 6 bits and carried respectively via the 6 PHICH resources. The encoding can be a simple repetition encoding or other encoding method.

Step 304 also can be implemented by way of a third mechanism: the first signaling is carried via the PCFICH.

In particular, when the third mechanism is implemented, a reserved state 4 of the PCFICH can be adopted to indicate the first signaling.

Step 304 also can be implemented by way of a fourth mechanism: the first signaling is carried via one or more than one redundant REG.

In general, a redundant resource-element group (REG) may occur in the downlink control region. The redundant REG can be used for carrying the first signaling, and the first signaling is encoded according to the size of the redundant REG resource.

It should be noted that, in practical application of the present disclosure, the subframe number of the flexible subframe and the feature thereof, as well as the channel and signal configuration of the flexible subframe can be configured by way of broadcasting. Where, the broadcasting message can take the form of master information block (MIB) or system information block (SIB). When carrying via MIB, redundant bits in the MIB can be used to notify the user. When carrying via SIB, new IE needs to be added.

It should be noted that, for simplicity of description, the above method embodiments are described as a series of operations, but it should be appreciated by persons skilled in the art that the present disclosure isn't restricted by the described operation sequence, since some steps can be implemented by other sequence or simultaneously according to the present disclosure. Also, it should be appreciated by persons skilled in the art that the embodiments described in the specification belong to preferred options, so the associated operations and units are not necessarily essential to the present disclosure.

Figure 4:
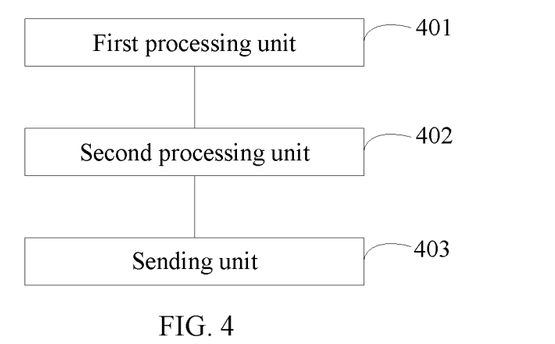
FIG. 4 is a schematic structural diagram of a base station in a time division duplex system according to a first embodiment of the present disclosure.

Corresponding to the method provided by the above embodiments, referring to FIG. 4, embodiments of the present disclosure also provide a schematic structural diagram of a base station applied to a time division duplex system, and the base station particularly can include:

a first processing unit 401, configured to determine the subframe number of a flexible subframe in a radio frame;

a second processing unit 402, configured to determine the feature of the flexible subframe corresponding to the subframe number determined by the first processing unit, where the feature indicates that the flexible subframe is an uplink subframe or a downlink subframe.

a sending unit 403, configured to send to a user equipment a first signaling via a downlink control channel, where the first signaling includes the feature of the flexible subframe corresponding to the subframe number and the feature of the flexible subframe is determined by the second processing unit.

Figure 5:
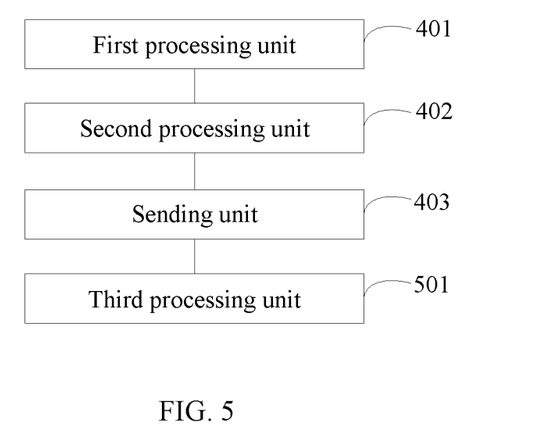
FIG. 5 is a schematic structural diagram of a sending unit of a base station according to an embodiment of the present disclosure.

In different practical applications or embodiments, as shown in FIG. 5, the base station can further include:

a third processing unit 501, configured to determine channel and signal configuration of the flexible subframe corresponding to the subframe number determined by the first processing unit;

then the sending unit 403, further configured to notify the user equipment of the channel and signal configuration determined by the third processing unit via the first signaling or a higher layer signaling.

In practical application, the channel and signal configuration can be sent to the user equipment via the downlink control channel or the higher layer signaling. It should be noted that, when the channel and signal configuration is sent to the user equipment via the downlink control channel, as a practical application example, the channel and signal configuration of the flexible subframe also can be sent to the user equipment by the sending unit 403 via the first signaling.

In another embodiment, the base station can further include:

the sending unit, further configured to notify the user equipment of the subframe number of the flexible subframe via the first signaling or a higher layer signaling.

Where, the subframe number of the flexible subframe can be notified to the user equipment via the downlink control channel or the higher layer signaling. When the subframe number is sent to the user equipment via the downlink control channel, the channel and signal configuration can be sent to the user equipment by the sending unit via the first signaling.

Figure 6:
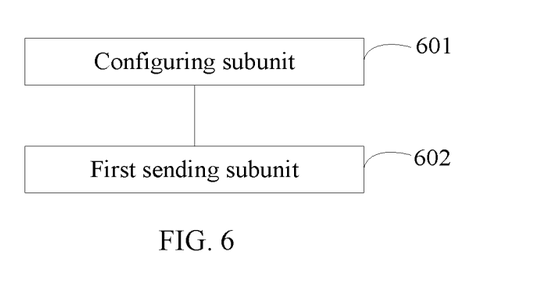
FIG. 6 is a schematic structural diagram of a sending unit of a base station according to another embodiment of the present disclosure.

Different sending unit 403 can be used depending on the downlink control channel, in another embodiment, when the downlink control channel is a physical downlink control channel, as shown in FIG. 6, the sending unit 403 particularly can include:

a configuring subunit 601, configured to configure same downlink control information for at least two user equipments; where bits of the downlink control information include one or more than one bit indicating the first signaling;

a first sending subunit 602, configured to send the same downlink control information to the user equipment via the physical downlink control channel within a common search space, to facilitate the user equipment to acquire the first signaling via the one or more than one indicating bit in the downlink control information.

Figure 7:
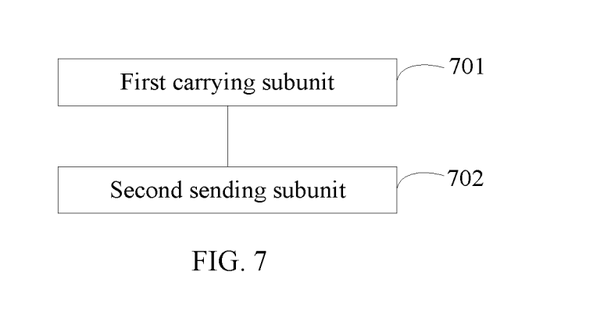
FIG. 7 is a schematic structural diagram of a sending unit of a base station according to another embodiment of the present disclosure.

In another embodiment, when the downlink control channel is a physical downlink control channel, as shown in FIG. 7, the sending unit 403 particularly can include:

a first carrying subunit 701, configured to carry the first signaling on one or more than one reserved bit of the downlink control information, where the downlink control information is formed in at least one format of DCI format 3, DCI format 3A and DCI format 1A;

a second sending subunit 702, configured to send the downlink control information to the user equipment via the physical downlink control channel.

Figure 8:
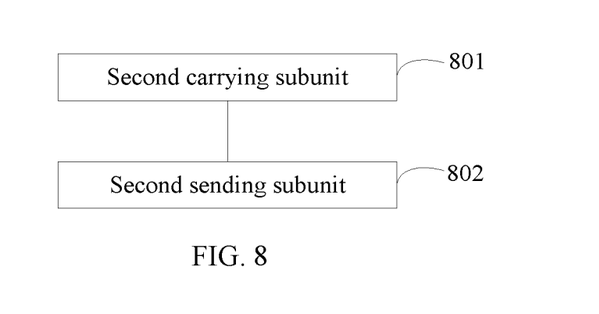
FIG. 8 is a schematic structural diagram of a base station in a time division duplex system according to a second embodiment of the present disclosure.

In another embodiment, when the downlink control channel is a physical hybrid-ARQ indicator channel, as shown in FIG. 8, the sending unit 403 particularly can include:

a second carrying subunit 801, configured to carry the first signaling on reserved resources of the physical hybrid-ARQ indicator channel; and a second sending subunit 802, configured to send to the user equipment the first signaling on the physical hybrid-ARQ indicator channel resources.

In practical application, the base station also can include: a data processing unit, configured to receive traffic data of a current radio frame sent by the user equipment according to the first signaling; or, send traffic data of the current radio frame to the user equipment according to the first signaling.

Figure 9:
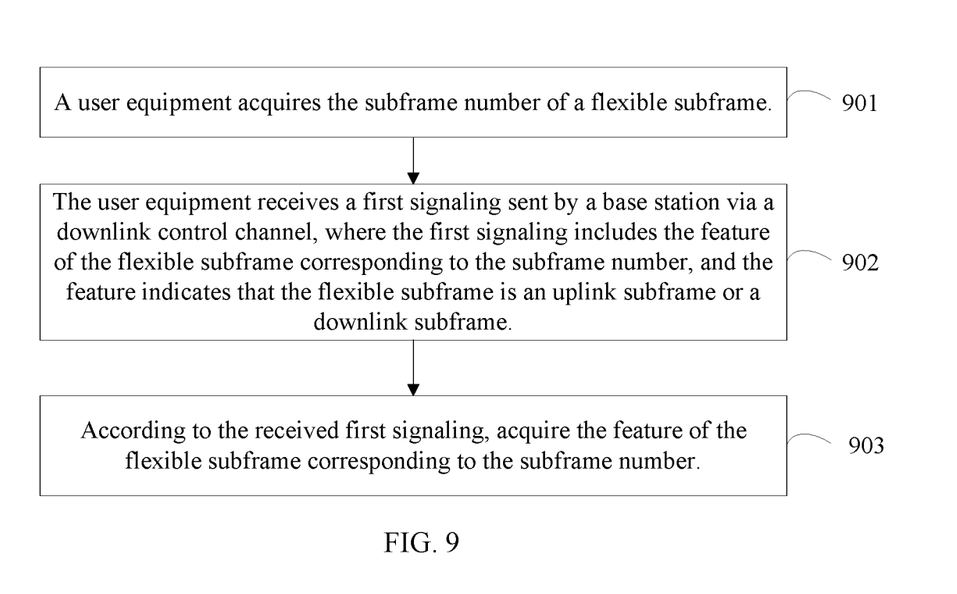
FIG. 9 is a flow chart of a method for subframe configuration in a time division duplex system according to a third embodiment of the present disclosure.

Referring to FIG. 9, which shows a flow chart of a method for subframe configuration applied to a time division duplex system according to an embodiment of the present disclosure, and the method, when applied to a terminal in the time division duplex system, particularly can include:

Step 901: A user equipment acquires the subframe number of a flexible subframe.

When acquiring the subframe number of a flexible subframe, the user equipment can determine the subframe number of the flexible subframe by receiving the signaling notification of the base station, and can also determine by way of predefining the subframe number of the flexible subframe.

The process of determining the subframe number of the flexible subframe by the base station has been described in detail in the first embodiment, and no further details are given here.

Step 902: The user equipment receives a first signaling sent by a base station via a downlink control channel, where the first signaling includes the feature of the flexible subframe corresponding to the subframe number, and the feature indicates that the flexible subframe is an uplink subframe or a downlink subframe.

Step 903: According to the received first signaling, acquire the feature of the flexible subframe corresponding to the subframe number.

In various embodiments, after receiving the feature of the flexible subframe, the user equipment also can receive channel and signal configuration of the flexible subframe sent by the base station via the downlink control channel and/or a high level signaling. Optionally, when the channel and signal configuration of the flexible subframe is also indicated via the downlink control channel, the first signaling further includes the channel and signal configuration of the flexible subframe.

In various embodiments, prior to determining the feature of the flexible subframe, the user equipment also can receive the subframe number of the flexible subframe notified by the base station via the downlink control channel or the high level signaling. Optionally, when the subframe number of the flexible subframe is also indicated via the downlink control channel, the first signaling further includes the subframe number of the flexible subframe.

It should be noted that, because the process of the method at the user equipment side is related to the process of the method at the base station side, except that the base station side is a transmitting end of the first signaling and the user equipment side is a receiving end of the first signaling, therefore, the contents relevant to the first signaling and different mechanisms of the user equipment on the downlink control channel can refer to the foregoing description on the base station side.

In this embodiment, the feature of the flexible subframe configured by the base station can be received via the downlink control channel, thus the problem in the prior art that the user equipment cannot be notified of the configuration of the flexible subframe via the signaling can be solved, and meanwhile the reliability of the signaling is relatively high, allowing the user equipment to accurately acquire the configuration of the flexible subframe. Where, the configuration of the flexible subframe can include the subframe number configuration of the flexible subframe and the feature configuration of the flexible subframe. Further, the channel and signal configuration of the flexible subframe also can be included.

Figure 10:
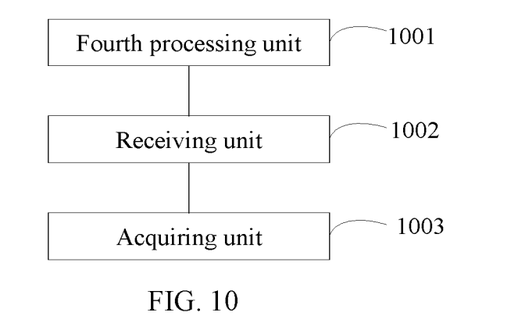
FIG. 10 is a schematic structural diagram of a user equipment in a time division duplex system according to a first embodiment of the present disclosure.

Referring to FIG. 10, which is a schematic structural diagram of a user equipment applied in a time division duplex system according to the present disclosure, the user equipment can include:

a fourth processing unit 1001, configured to determine the subframe number of a flexible subframe;

a receiving unit 1002, configured to receive, after a base station determines the feature of the flexible subframe in a current radio frame, a first signaling sent by the base station via a downlink control channel, where the first signaling includes the feature of the flexible subframe corresponding to the subframe number, and the feature indicates that the flexible subframe is an uplink subframe or a downlink subframe.

an acquiring unit 1003, configured to acquire, according to the received first signaling, the feature of the flexible subframe corresponding to the subframe number.

In various embodiments, the receiving unit further can be configured to receive channel and signal configuration of the flexible subframe sent by the base station via the first signaling and/or a high level signaling. Optionally, when the channel and signal configuration of the flexible subframe is also indicated via the downlink control channel, the first signaling can further include the channel and signal configuration of the flexible subframe.

In various embodiments, the receiving unit further can be configured to receive the subframe number of the flexible subframe notified by the base station via the first signaling or a high level signaling. Optionally, when the subframe number of the flexible subframe is also indicated via the downlink control channel, the first signaling can further include a subframe number of the flexible subframe.

Figure 11:
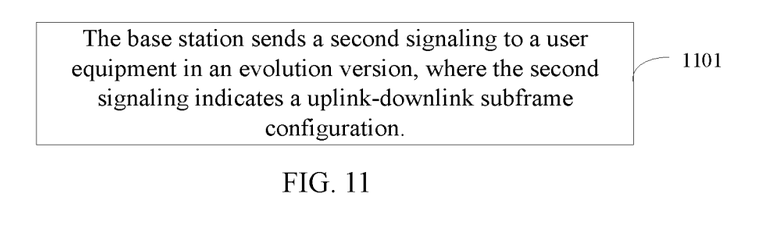
FIG. 11 is a flow chart of a method for subframe configuration in a time division duplex system according to a fourth embodiment of the present disclosure.

Embodiments of the present disclosure provide another embodiment of a method for subframe configuration in a time division duplex system, applied at the base station side, referring to FIG. 11, the method for implementing embodiments of the present disclosure can include the following steps:

Step 1101: A base station sends a second signaling to a user equipment of an evolution version, where the second signaling indicates an uplink-downlink subframe configuration.

The uplink-downlink subframe configuration indicated by the second signaling can be different from the uplink-downlink subframe configuration notified to a user equipment of a non-evolution version (such as, LTE Rel-8/9/10). For example, the uplink-downlink subframe configuration currently notified to a user equipment of a non-evolution version is 2, while the uplink-downlink subframe configuration notified to a user equipment of an evolution version is 1. In this way, not only the compatibility of the existing versions can be guaranteed, but also the uplink-downlink subframe configuration in an evolution version can be changed flexibly based on the uplink-downlink traffic demands.

For a user equipment of a non-evolution version (such as, LTE Rel-8/9/10), the system notifies the current seven types of uplink-downlink subframe configurations via a broadcast signaling.

For a user equipment in an evolution system (such as LTE Rel-11/12), the base station can semi-statically or dynamically notify the current uplink-downlink subframe configuration (which can be the existing seven types of configurations, also can be a newly added uplink-downlink subframe configuration) via a higher layer signaling or a downlink control channel. The frequency of the notification can be periodic or semi-persistent. In particular, when the higher layer signaling is adopted, RRC signaling or MAC signaling can be used so that the current uplink-downlink subframe configuration of the user equipment can be respectively configured, for example, some user equipments of an evolution version can be notified to adopt a uplink-downlink subframe configuration which is different from the uplink-downlink subframe configuration of the user equipments of an existing version, and also, user equipments of different evolution versions can be configured with different uplink-downlink subframe configurations. When the physical downlink control channel is adopted, the method provided in step 304 of the second embodiment (except that the first signaling is carried in the second embodiment, and the second signaling is carried in this embodiment) can be used to carry the second signaling via PDCCH, or PHICH, or PCFICH, or redundant REG.

In addition, the base station can configure a valid time (duration) of the second signaling, the minimum unit of the valid time can be at a radio frame level (10 ms for one radio frame), for example, the base station configures that the current second signaling is valid within 100 radio frames or 50 radio frames; the minimum unit also can be at the millisecond (ms) level, for example, the base station configures that the current second signaling is valid within 100 ms or 1000 ms. The method for configuring and notifying a valid time of the second signaling can specifically include the following methods:

First method, the valid time of the second signaling is notified via a higher layer signaling. In particular, RRC signaling or MAC signaling can be used. When the second signaling is notified via the higher layer signaling, the notification of the valid time can be sent together with the second signaling.

Second method, the valid time of the second signaling is notified via a physical downlink control channel. When the second signaling is notified via the physical downlink control channel, the notification of the valid time can be sent together with the second signaling.

Third method, predefine. The valid time of the second signaling can be predefined in a standard, such as 100 radio frames.

In this embodiment, the uplink-downlink subframe configuration of the user equipment of an evolution version can be separately indicated via the higher layer signaling or the downlink control channel, thus the problem in the prior art that the user equipment cannot be notified of the configuration of the flexible subframe via the signaling can be solved, and meanwhile the reliability of the signaling is relatively high, allowing the user equipment to accurately acquire the configuration of the flexible subframe.

Figure 12:
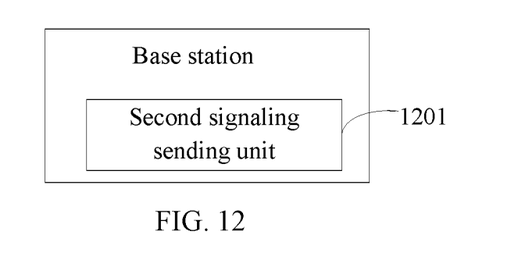
FIG. 12 is a schematic structural diagram of a base station in a time division duplex system according to a third embodiment of the present disclosure.

Corresponding to the method provided by the above embodiment, embodiments of the present disclosure also provide a base station applied to a time division duplex system, referring to FIG. 12, and the base station particularly can include:

a second signaling sending unit 1201, configured to send a second signaling to a user equipment of an evolution version, where the second signaling indicates an uplink-downlink subframe configuration.

Figure 13:
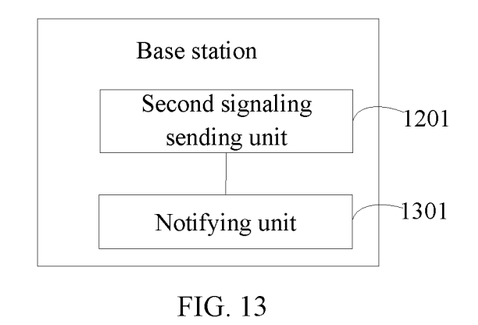
FIG. 13 is a schematic structural diagram of a base station in a time division duplex system according to a fourth embodiment of the present disclosure.

When the base station also needs to notify a valid time of the second signaling via a higher layer signaling or a physical downlink control channel, referring to FIG. 13, the base station side also includes:

a notifying unit 1301, configured to notify a valid time of the second signaling to the user equipment of the evolution version.

Figure 14:
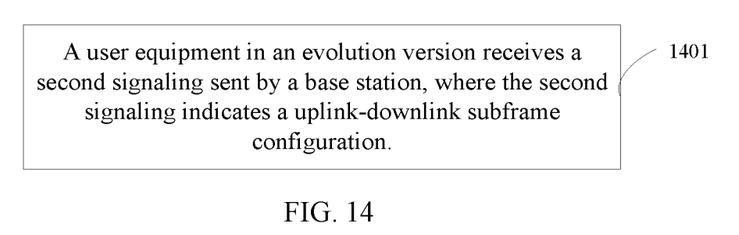
FIG. 14 is a flow chart of a method for subframe configuration in a time division duplex system according to a fifth embodiment of the present disclosure.

Corresponding to the method provided by the above embodiment, embodiments of the present disclosure provide another embodiment of the method for subframe configuration in a time division duplex system, applied at the user equipment side, referring to FIG. 14, the method for implementing embodiments of the present disclosure can include the following steps:

Step 1401: A user equipment of an evolution version receives a second signaling sent by a base station, where the second signaling indicates an uplink-downlink subframe configuration.

The uplink-downlink subframe configuration indicated by the second signaling can be different from the uplink-downlink subframe configuration notified to the user equipment of a non-evolution version (such as, LTE Rel-8/9/10). The user equipment of an evolution version can semi-statically or dynamically know the uplink-downlink subframe configuration via a higher layer signaling or a downlink control channel.

In addition, the user equipment in the evolution version needs to acquire a valid time (duration) of the second signaling. The particular method for acquiring a valid time of the second signaling can include the following methods:

First method, receiving a higher layer signaling and acquiring a valid time of the second signaling.

Second method, receiving a physical downlink control channel and acquiring a valid time of the second signaling.

Third method, predefining.

Figure 15:
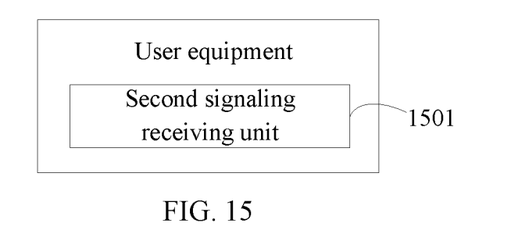
FIG. 15 is a schematic structural diagram of a user equipment in a time division duplex system according to a second embodiment of the present disclosure.

Corresponding to the method provided by the above embodiment, embodiments of the present disclosure also provide a user equipment applied to a time division duplex system, referring to FIG. 15, and the user equipment particularly can include:

a second signaling receiving unit 1501, configured to receive a second signaling sent by a base station, where the second signaling indicates a uplink-downlink subframe configuration. Such unit is only configured on the user equipment of an evolution version.

Figure 16:
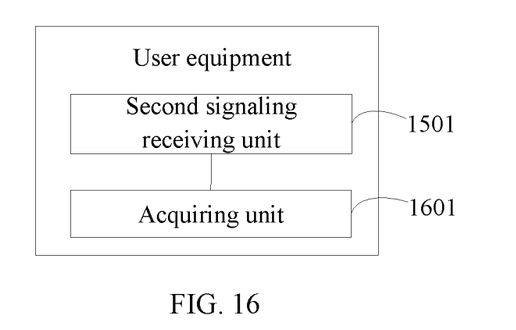
FIG. 16 is a schematic structural diagram of a user equipment in a time division duplex system according to a third embodiment of the present disclosure.

When the user equipment also needs to acquire a valid time of the second signaling via a higher layer signaling or a physical downlink control channel, referring to FIG. 16, the user equipment also includes:

an acquiring unit 1601, configured to received a higher layer signaling or a physical downlink control channel and acquire a valid time of the second signaling. Such unit is only configured on the user equipment of an evolution version.

It should be noted that all embodiments in the specification are described in a progressive way, each embodiment mainly describes the differences from other embodiments, so the equivalent or similar parts among the embodiments can be referenced mutually. The embodiments of the device and the system are described relatively simple because they correspond to the method embodiments basically, and related parts may refer to the descriptions of the corresponding parts in the method embodiments.

It should be noted that, the terms "comprise", "include" or any variations thereof as used herein are intended to cover a non-exclusive inclusion, so that a process, method, article, or apparatus that comprises a list of elements does not include only those elements but may include other elements not expressly listed or inherent to such process, method, article, or apparatus. An element defined by "comprises a . . . ", without more constraints, does not preclude the existence of additional identical elements in the process, method, article, or apparatus that comprises the element.

It should be appreciated by persons skilled in the art that, all or a part of the steps in the method of the above embodiments may be completed by relevant hardware under the instruction of a program, and the program may be stored in a computer readable storage medium, such as a read only memory (ROM), a random access memory (RAM), a floppy disk, or an optical disk.

The method, the base station and the user equipment for subframe configuration in a time division duplex provided by embodiments of the present disclosure have been described in detail above, in the present disclosure the particular examples are used to explain the principle and embodiments of the present disclosure, and the above description of embodiments is merely intended to facilitate understanding the methods in the embodiments of the disclosure and concept thereof; meanwhile, it is apparent to persons skilled in the art that changes can be made to the particular implementation and application scope of the present disclosure based on the concept of the embodiments of the disclosure, in view of the above, the contents of the specification shall not be considered as a limitation to the present disclosure.

What is claimed is:

1. A method, comprising:
    determining, by a base station, a subframe number of a flexible subframe;
    sending, by the base station, a higher layer signaling that indicates the subframe number of the flexible subframe;
    determining, by the base station, a feature of the flexible subframe identified by the subframe number, wherein the feature of the flexible subframe indicates whether the flexible subframe is uplink or downlink; and
    sending, by the base station, the same downlink control information to at least two terminal devices via a physical downlink control channel (PDCCH) within a common search space, wherein the downlink control information indicates the feature of the flexible subframe, the downlink control information is scrambled by a radio network temporary identifier (RNTI), and the RNTI used to scramble the downlink control information is the same for each terminal device of the at least two terminal devices.

2. The method according to claim 1, further comprising:
    determining channel and signal configuration of the flexible subframe; and
    sending, to the at least two terminal devices, the channel and signal configuration via the PDCCH and/or a second higher layer signaling.

3. The method according to claim 1, further comprising:
    sending the subframe number of the flexible subframe via a second higher layer signaling to the at least two terminal devices.

4. The method according to claim 1, wherein the downlink control information further comprises cyclic redundancy check (CRC) information.

5. The method according to claim 1, wherein the downlink control information is sent in a periodic manner to the at least two terminal devices.

6. A method, comprising:
    receiving, by a terminal device, a higher layer signaling that indicates a subframe number of a flexible subframe;
    receiving, by the terminal device, downlink control information from a base station via a physical downlink control channel (PDCCH) within a common search space, wherein the downlink control information indicates a feature of the flexible subframe, wherein the feature of flexible subframe indicates whether the flexible subframe is uplink or downlink, wherein the downlink control information is scrambled by a radio network temporary identifier (RNTI), and the RNTI used to scramble the downlink control information is the same for at least two terminal devices; and
    obtaining, by the terminal device, the feature of the flexible subframe identified by the subframe number according to the downlink control information.

7. The method according to claim 6, further comprising:
    receiving channel and signal configuration via the PDCCH and/or a second higher layer signaling.

8. The method according to claim 6, further comprising:
    receiving the subframe number of the flexible subframe via a second higher layer signaling.

9. The method according to claim 6, wherein the downlink control information further comprises cyclic redundancy check (CRC) information.

10. The method according to claim 6, wherein the downlink control information is received by the terminal device a periodic manner.

11. An apparatus, comprising:
    a processor; and
    a transmitter for sending information,
    wherein:
    the processor is configured to determine a subframe number of a flexible subframe;
    the transmitter is configured to send a higher layer signaling that indicates the subframe number of the flexible subframe;
    the processor is configured to determine a feature of the flexible subframe identified by the subframe number, wherein the feature of the flexible subframe indicates whether the flexible subframe is uplink or downlink; and
    the transmitter is configured to send downlink control information to at least two terminal devices via a physical downlink control channel (PDCCH) within a common search space, wherein the downlink control information indicates the feature of the flexible subframe, the downlink control information is scrambled by a radio network temporary identifier (RNTI), and the RNTI used to scramble the downlink control information is the same for each terminal device of the at least two terminal devices.

12. The apparatus according to claim 11,
    wherein the processor is further configured to determine channel and signal configuration of the flexible subframe; and wherein the transmitter is further configured to send, to the at least two terminal devices, the channel and signal configuration via the PDCCH and/or a second higher layer signaling.

13. The apparatus according to claim 11, wherein the transmitter is further configured to send the subframe number of the flexible subframe via a second higher layer signaling to the at least two terminal devices.

14. The apparatus according to claim 11, wherein the downlink control information further comprises cyclic redundancy check (CRC) information.

15. The apparatus according to claim 11, wherein the downlink control information is sent to the at least two terminal devices in a periodic manner.

16. An apparatus, comprising:
receiver configured to:
receive a higher layer signaling that indicates a subframe number of a flexible subframe; and
receive downlink control information via a physical downlink control channel (PDCCH) within a common search space, wherein the downlink control information indicates a feature of the flexible subframe, the downlink control information is scrambled by a radio network temporary identifier (RNTI), and the RNTI used to scramble to the downlink control information is the same for each terminal device of at least two terminal devices; and
a processor configured to obtain the feature of the flexible subframe identified by the subframe number according to the downlink control information, wherein the feature of the flexible subframe indicates that the flexible subframe is uplink or downlink.

17. The apparatus according to claim 16, wherein the receiver is further configured to receive channel and signal configuration via the PDCCH and/or a second higher layer signaling.

18. The apparatus according to claim 16, wherein the receiver is further configured to receive the subframe number of the flexible subframe via a second higher layer signaling.

19. The apparatus according to claim 16, wherein the downlink control information further comprises cyclic redundancy check (CRC) information.

20. The apparatus according to claim 16, wherein the downlink control information is received by at least two terminal devices in a periodic manner.

21. A non-transitory machine-readable medium having stored thereon a computer program comprising at least one code section for distributing data, the at least one code section being executable by a machine for causing the machine to perform acts of:
determining a subframe number of a flexible subframe;
sending a higher layer signaling that indicates the subframe number of the flexible subframe;
determining a feature of the flexible subframe identified by the subframe number, wherein the feature of the flexible subframe indicates whether the flexible subframe is uplink or downlink; and
sending downlink control information to at least two terminal devices via a physical downlink control channel (PDCCH) within a common search space, wherein the downlink control information indicates the feature of the flexible subframe, the downlink control information is scrambled by a radio network temporary identifier (RNTI), and the RNTI used to scramble the downlink control information is the same for each terminal device of the at least two terminal devices.

22. A non-transitory machine-readable medium having stored thereon a computer program comprising at least one code section for distributing data, the at least one code section being executable by a machine for causing the machine to perform acts of:
receiving a higher layer signaling that indicates a subframe number of a flexible subframe;
receiving downlink control information from a base station via a first physical downlink control channel (PDCCH) within a common search space, wherein the downlink control information indicates a feature of flexible subframe, the downlink control information is scrambled by a radio network temporary identifier (RNTI), and the RNTI used to scramble the downlink control information is the same for each terminal device of at least two terminal devices; and
obtaining the feature of the flexible subframe identified by the subframe number according to the downlink control information, wherein the feature of the flexible subframe indicates that the flexible subframe is uplink or downlink.

* * * * *